(12) United States Patent
Halverson et al.

(10) Patent No.: US 6,377,247 B1
(45) Date of Patent: Apr. 23, 2002

(54) TOUCH SCREEN SYSTEM FOR SIMULATING WEB-UP OF A PRESS LINE

(75) Inventors: Thomas A. Halverson, Delafield; Michael D. Sisco, Pewaukee, both of WI (US)

(73) Assignee: Quad/Tech, Inc., Sussex, WI (US)

( * ) Notice: Subject to any disclaimer, the term of this patent is extended or adjusted under 35 U.S.C. 154(b) by 0 days.

(21) Appl. No.: 09/254,562

(22) PCT Filed: Sep. 9, 1997

(86) PCT No.: PCT/US97/15873

§ 371 Date: Mar. 8, 1999

§ 102(e) Date: Mar. 8, 1999

(87) PCT Pub. No.: WO98/10337

PCT Pub. Date: Mar. 12, 1998

Related U.S. Application Data (60) Provisional application No. 60/019,758, filed on Sep. 9, 1996.

(51) Int. Cl.[7] ............................ G09G 5/00; B41F 3/36; B41G 45/00
(52) U.S. Cl. .......................... 345/173; 101/156; 101/73
(58) Field of Search .......................... 345/173; 700/122, 700/115; 101/183, 73, 156, 211

(56) References Cited

U.S. PATENT DOCUMENTS

| 3,734,487 | A | | 5/1973 | Treff |
| 4,520,454 | A | | 5/1985 | Dufour et al. |
| 5,453,926 | A | * | 9/1995 | Stroschin et al. ............. 700/83 |
| 5,765,481 | A | * | 6/1998 | Tortora et al. .............. 101/211 |
| 6,055,408 | A | * | 4/2000 | Creutzmann et al. ....... 399/384 |
| 6,160,985 | A | * | 12/2000 | Hou ........................... 399/384 |

* cited by examiner

Primary Examiner—Richard Hjerpe
Assistant Examiner—Duc Q Dinh
(74) Attorney, Agent, or Firm—Michael Best & Friedrich LLP (57) ABSTRACT

A method for simulating one of a plurality of web-up configurations for a press line in order to provide web length information associated with the selected web-up configuration (32) to a product tracking system (16). The method includes providing a drawing of a press line on a touch screen (24) and pulling a virtual web through the drawing to illustrate a selected web-up configuration (32). Web length information is calculated based on the selected web-up configuration (32) and is communicated to the product tracking system (16).

20 Claims, 8 Drawing Sheets

| WEB ORIGIN/SOURCE: | Op1 | Gr1 | Op2 | Gr2 |
|---|---|---|---|---|
| MAIN PRESET: | | | | |
| LEVEL ASSIGNMENT: | 2 | 1 | 3 | 4 |
| RIBBON/SWITCH ASSIGNMENT: | 3 | 1 | 4 | 2 |
| RIBBON EXITS BAR TOWARD: | Gr | Op | Gr | Op |
| BAR PRESET: | — | — | — | — |
| RIBBON EXITS COMP TOWARD: | Gr | Op | Gr | Op |
| COMP PRESET: | — | — | — | — |
| FORMER NOSE SELECTION: | F | F | F | F |

Fig. 5

| WEB ORIGIN/SOURCE: | Op1 | Gr1 | Op2 | Gr2 |
|---|---|---|---|---|
| MAIN PRESET: | | | | |
| LEVEL ASSIGNMENT: | 2 | 1 | 3 | 4 |
| RIBBON/SWITCH ASSIGNMENT: | 3 | 2 | 4 | 1 |
| RIBBON EXITS BAR TOWARD: | Gr | Op | Gr | Op |
| BAR PRESET: | — | — | — | — |
| RIBBON EXITS COMP TOWARD: | Gr | Op | Gr | Op |
| COMP PRESET: | — | — | — | — |
| FORMER NOSE SELECTION: | F | F | F | F |

Fig. 6

| | Op1 | Gr1 | Op2 | Gr2 |
|---|---|---|---|---|
| WEB ORIGIN/SOURCE: | | | | |
| MAIN PRESET: | | | | |
| LEVEL ASSIGNMENT: | 1 | 2 | 3 | 4 |
| RIBBON/SWITCH ASSIGNMENT: | 1 | 2 | 3 | 4 |
| RIBBON EXITS BAR TOWARD: | Gr | Op | Gr | Op |
| BAR PRESET: | — | — | — | — |
| RIBBON EXITS COMP TOWARD: | Gr | Op | Gr | Op |
| COMP PRESET: | — | — | — | — |
| FORMER NOSE SELECTION: | F | F | F | F |

Fig. 1

| WEB ORIGIN/SOURCE: | Op1 | Gr1 | Op2 | Gr2 |
|---|---|---|---|---|
| MAIN PRESET: | | | | |
| LEVEL ASSIGNMENT: | 1 | 2 | 3 | 4 |
| RIBBON/SWITCH ASSIGNMENT: | 1 | 3 | 2 | 4 |
| RIBBON EXITS BAR TOWARD: | Gr | Gr | Gr | Gr |
| BAR PRESET: | — | — | — | — |
| RIBBON EXITS COMP TOWARD: | Gr | Gr | Gr | Gr |
| COMP PRESET: | — | — | — | — |
| FORMER NOSE SELECTION: | F | R | F | R |

Fig. 8

TOUCH SCREEN SYSTEM FOR SIMULATING WEB-UP OF A PRESS LINE

This application claims the benefit of the filing date of provisional patent application Ser. No. 60/019,758 filed on Sep. 9, 1996.

FIELD OF THE INVENTION

The invention relates to a system and method for simulating a web-up configuration of a press line in order to provide information to various components on the press line, such as a product tracking system or the lead-in section of a folder.

BACKGROUND OF THE INVENTION

On a multicolor web-fed press line, a web of material (e.g. paper) is sequentially driven from a roll stand to one or more printing units and through a series of web processing stations. The web processing stations making up a given press line can vary. A given press line is typically set up to include a number of web processing stations which may or may not be used during a particular press run, or which are capable of being webbed up in different ways. A given press line is often capable of producing various types of printed product, depending on how the web is fed through the different processing stations.

A typical press line includes a roll stand holding one or more web rolls. The rolls can be spliced together on the fly as the web travels through the press line. The web is fed to the printing units, each of which is operable to apply a different color ink to the web in order to produce a multi-color image. Each printing unit includes a rotating printing cylinder and blanket cylinder, and may include two of each so as to be capable of printing on both sides of the web. A color registration unit is employed to maintain registration (alignment) between respective ink colors.

The web is typically routed through a thermal dryer which dries the ink and then to a series of chill rolls which operate to cool the web and set the ink. A coating unit applies silicone to the web. Subsequently, a slitter slits the web longitudinally (in a direction parallel to the direction of web movement) into two or more ribbons. The ribbons are directed to a folder where the ribbons are aligned one on top of the other. The folder operates to longitudinally fold the ribbons. The folder also includes a cutting unit which operates to cut the folded ribbons in a direction transverse to the direction-of web movement to produce a plurality of "signatures" or "books".

A cutoff control system operates to control the longitudinal position of the ribbons such that the ribbons are cut at the appropriate time in order to separate the repeating images on the ribbons. The folder may also include a delivery unit including a diverter section which operates to alternately load the signatures onto one or more conveyor lines. The signatures can be subsequently processed off-line into magazines or the like.

The above description of a typical press line and typical process may be varied by the way the web is fed through the various web processing stations. For example, a given press line may be capable of running either one or two webs. Further, the number of printing units used in a press run can be varied such that it is possible to print with either greater than or less than the standard four ink colors. Also, special colors and/or inks can be used. The web can be also slit in more than one location, or not slit at all. A folder may include one or more former boards (where the longitudinal fold occurs) such that different signatures can be produced during the same press run. Additionally, the lead-in section of a folder may permit the ribbons to be aligned with respect to each other in any of a number of ways in order to accommodate various page configurations as laid out on the printing cylinder. The signatures produced may include four, eight, or sixteen pages. Thus, depending on the printed product desired, a given press line can be webbed up in many different ways.

In order to monitor acceptable and unacceptable quality of the printed product, various product tracking systems have been developed. In one such system, different product tracking devices record certain events or conditions and the position where these events occur in order to correlate these events with the signatures at the end of the press line. The types of events and conditions that are monitored in order to provide useful information to the product tracking system include splices between paper rolls, tension problems, blanket washes, product blemishes, lateral web alignment, color registration, and so on. For example, during a long printing run, it is typically necessary to perform periodic blanket washes. The occurrence of a blanket wash is communicated to the product tracking system so that the signatures coming off the end of the press line which were produced during the blanket wash will be rejected as unacceptable product.

Previous product tracking systems required the lengths of various web paths to be measured and manually input into the system in order that proper tracking could take place for each impression printed on the web. Additionally, these systems required that the product tracking devices on the press line be specified for each particular press run in order to maintain proper correlation between the occurrence of certain events and the signatures produced corresponding to those events.

SUMMARY OF THE INVENTION

The invention provides a touch screen system for simulating the manner in which a press line is webbed up, i.e., the way that a paper web is drawn through the various rollers, printing units, and web processing stations comprising the press line. As previously discussed, the manner in which a press line is webbed up can vary in a great number of ways according to the type of printed product to be produced.

The touch screen system includes a computer and a touch screen responsive to input from a human operator. A CAD drawing of the press line is provided on the screen and includes a virtual web. The touch screen allows an operator to touch the area of the screen corresponding to the beginning of the virtual web, and pull the virtual web through the image of the press line on the screen to simulate the web-up of the press line. The touch screen system also includes an interface to the product tracking system. The computer is programmed to calculate actual web lengths based on the particular web-up configuration illustrated and to communicate that information along with the correct product tracking devices for each particular web-up configuration to the product tracking system.

The touch screen system can also be interfaced with a folder on the press line. A folder typically includes a lead-in section which includes several angle bars, various rollers, and compensators. Movement of an angle bar will move its associated ribbon laterally to the left or to the right. Movement of a compensator will advance or retard its associated ribbon in the longitudinal direction. The positions of the angle bars and compensators are selected according to the job to be run on the press line.

The ribbons are driven through the lead-in section to a draw section of the folder. The ordering of the ribbons in the lead-in section of the folder may be changed when the ribbons are delivered to the draw section of the folder.

The folder includes control switches, each of which is permanently associated with one of a plurality of ribbons at the draw section of the folder. The control switches are mapped to control the movement of its associated ribbon at the lead-in section of the folder. The touch screen system provides the control switches with appropriate mapping information based on the particular web-up configuration entered such that the control switches are mapped to directly control the movement of the ribbons at the draw section regardless of the way the web is webbed up through the lead-in section. The angle bars and compensators in the lead-in section are moved by motors which are controlled by the control switches. Thus, the control switches are mapped to appropriately control a ribbon's associated angle bars or compensators based on the web-up configuration entered.

The control switches are mapped according to the web-up configuration entered in order to make it easier for an operator to use the switches without having to know the particular web-up configuration in the lead-in section. Thus, it is not necessary for the operator to know whether the angle bar associated with a particular ribbon is initially turned to the gear side or the operator side of the press. Additionally, it is not necessary for the operator to know how the ribbons are interleaved from the lead-in section to the draw section of the folder. Similarly, it is not necessary for the operator to know whether the compensator is webbed up from the left or from the right.

For example, a control switch will control the lateral movement of the top ribbon in the draw section of the folder regardless of how the ribbon is webbed through the lead-in section. The control switch associated with lateral movement of the top ribbon will move that ribbon correctly regardless of whether the ribbon's associated angle bar in the lead-in section is initially turned to the gear side or to the operator side, and regardless of the ordering of the ribbons in the lead-in section of the folder. Similarly, the control switch associated with longitudinal movement of the top ribbon will be mapped to control the motor for the particular compensator associated with the top ribbon. The top ribbon will be advanced or retarded by moving the control switch in a particular direction regardless of the manner in which the web is webbed up through the compensator.

Other features and advantages of the invention will become apparent to those skilled in the art upon review of the following detailed description, claims and drawings.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 1:
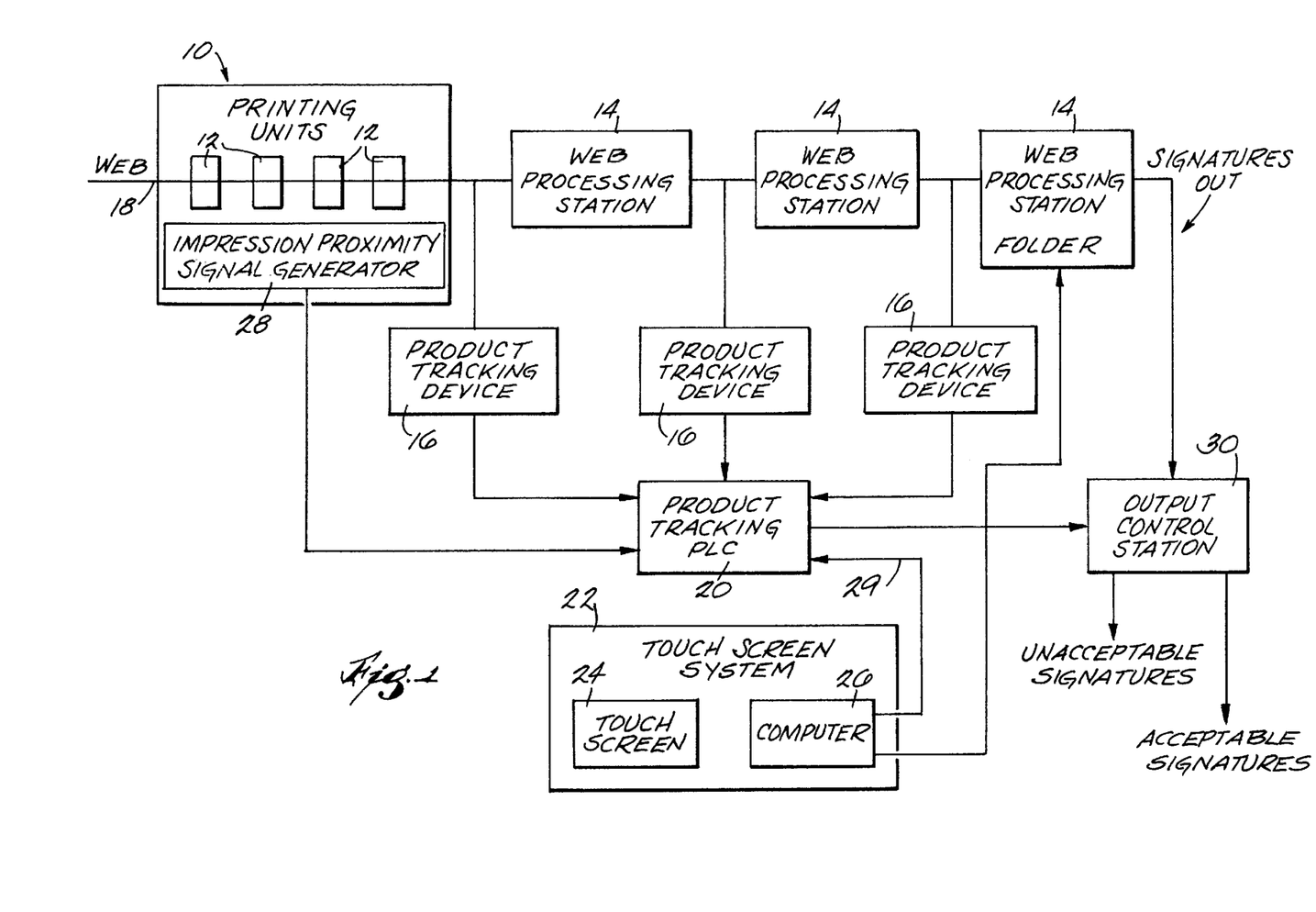
FIG. 1 illustrates a touch screen system interfaced with a press line and a product tracking programmable logic controller (PLC).

FIG. 1 illustrates schematically a press line 10 which includes a plurality of printing units 12, web processing stations 14, and product tracking devices 16. A web 18 is sequentially driven through the printing units 12 and past each of the web processing stations 14 in turn. Each of the web processing stations 14 is capable of performing an operation on the web. For example, the web processing stations may include a dryer, a series of chill rolls, a silicone coater, a slitter, a folder, or any of a number of other processing stations that are known in the printing industry.

The various product tracking devices 16 along the press line 10 provide information to a product tracking PLC 20 regarding the condition of the web at a particular point. For example, one product tracking device may provide a signal from a printing unit 12 with information regarding whether or not the printing unit is applying ink to the web 18. Another product tracking device may provide a signal from a web guide with information regarding whether or not the web 18 is laterally aligned. Another product tracking device may provide a signal from a register guidance system with information concerning whether or not the ink colors are in register. Another product tracking device may provide a signal from a cutoff control system with information concerning whether or not cutoff has occurred in the proper location. Another product tracking device may provide a signal from an operator who manually inspects the product coming off the folder (or at any other location on the press line) and indicates whether the product is acceptable or not.

Also illustrated in FIG. 1 is a touch screen system 22 which includes a touch screen 24 interfaced with a computer 26. The touch screen 24 is capable of displaying an image of the press line. In the preferred embodiment, an AZONIX touch screen PC is utilized, although any number of touch screen systems could instead be used. Certain information regarding a given press line must be input to the computer. A computer aided design (CAD) drawing of the press line is provided as input to the touch screen system. The CAD drawing is scaled to correspond to the actual physical dimensions of the press line so that web lengths between various points can be ascertained. The computer may include limited editing capabilities to allow certain dimensions to be changed so as to make the drawing correspond with actual physical dimensions of the press line. The existence and location of all product tracking devices on the press line are also provided as input to the computer.

The touch screen system 22 is operable to simulate the manner in which a press line is webbed up. The touch screen system allows an operator to touch the area of the screen corresponding to the beginning of a virtual web, and pull the virtual web through the image of the press line on the screen to simulate a particular web-up configuration. The computer is programmed to calculate actual web lengths based on the particular web-up configuration illustrated and to communicate that information along with the associated product tracking devices to the product tracking PLC 20.

The product tracking PLC 20 also receives as an input an impression proximity signal from an impression proximity signal generator 28 which indicates when a printing cylinder of a printing unit has completed a rotation. This is a type of synchronization signal which is monitored by the product tracking PLC 20. The product tracking PLC 20 also monitors the outputs from the relevant product tracking devices 16 to determine where and when unacceptable product occurs. By knowing the web lengths between the web processing stations 14 and product tracking devices 16 (as determined by the touch screen system, as further explained below and communicated to product tracking PLC 20 via line 29), and the image repeat length for the given press run, and using the synchronization signal, the product tracking PLC 20 provides an output signal which is indicative of acceptable or unacceptable product. The output signal is directed to an output control station 30 at the appropriate time.

The output control station 30 receives the output signal from the product tracking PLC 20 and controls the destination of the signatures at that point. For example, the output control station 30 may control a waste gate which is used to divert unacceptable signatures. Alternately, the output control station 30 may include a marking system which marks unacceptable signatures which can then be manually removed from the acceptable stack of signatures.

The touch screen system 22 also communicates with a web processing station such as a folder 31 on the press line. The folder 31 includes a lead-in section and a draw section. The folder 31 includes control switches which are associated with a specific ribbon at the draw section of the folder and are mapped to control the movement of that ribbon at the lead-in section of the folder. The touch screen system 22 provides the control switches with appropriate mapping information based on the particular web-up configuration entered so that the control switches control the movement of the ribbons regardless of the way the web is webbed up through the lead-in section.

Figure 2:
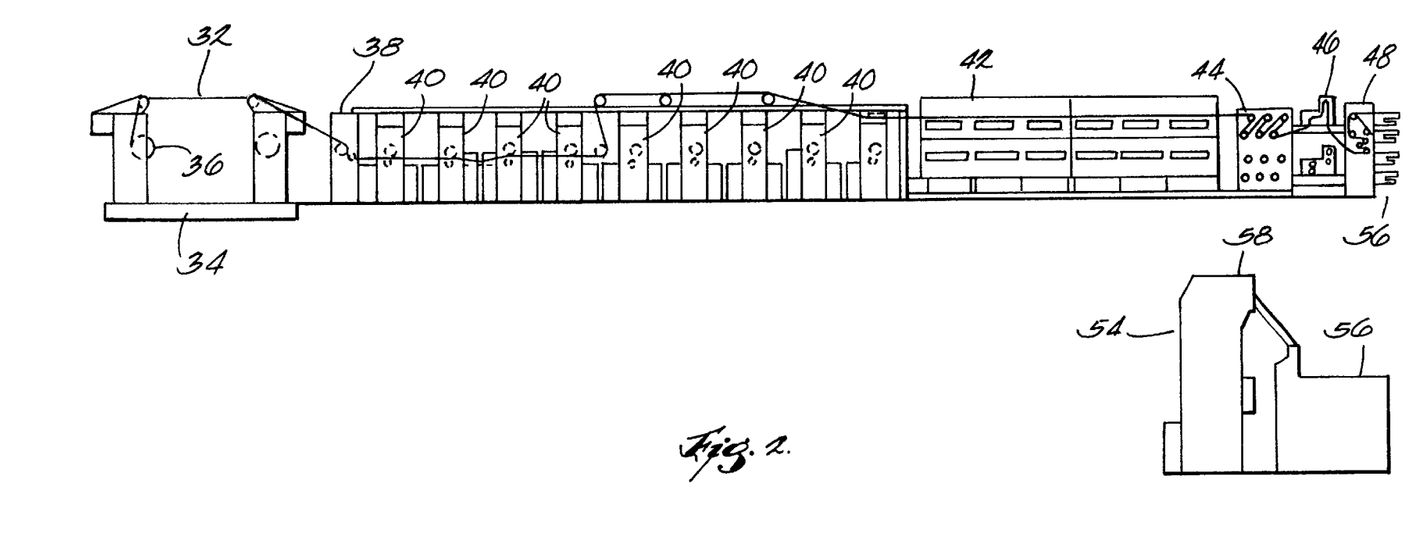
FIG. 2 illustrates a typical press line on the screen of the touch screen system.

A typical press line as it would be illustrated on the touch screen system 22 is shown in FIG. 2. A virtual web 32 is illustrated passing through several virtual web processing stations according to how the actual press line 10 is to be webbed-up. The virtual web 32 is pulled from a virtual roll stand 34 including rolls 36. The actual roll stand is capable of holding one or two web rolls. The virtual web 32 is fed to a virtual infeed web guide 38. The infeed web guide operates to control the lateral position of the web. The virtual web 32 is fed to one or more virtual printing units 40. Each actual printing unit is operable to apply a different color ink to the web in order to produce a multicolor image. A color registration unit (not shown) is typically employed to maintain registration (alignment) between respective ink colors. The virtual web is fed to a virtual thermal dryer 42 and through a series of virtual chill rolls 44. The actual thermal dryer operates to dry the ink, and the chill rolls operate to cool the web and set the ink. The virtual web 32 is fed through a silicone coating unit 46 and then to a virtual slitter 48 and full web compensator. The actual slitter operates to slit the web longitudinally (i.e., in a direction parallel to the direction of web movement) into two or more ribbons. The illustrated press line includes both upper and lower dryers, chill rolls, silicone coaters, and slitters. The web-up configuration illustrated by the path of the virtual web through the press line shows the web passing through the upper units of these processing stations rather than the lower units.

Figure 3:
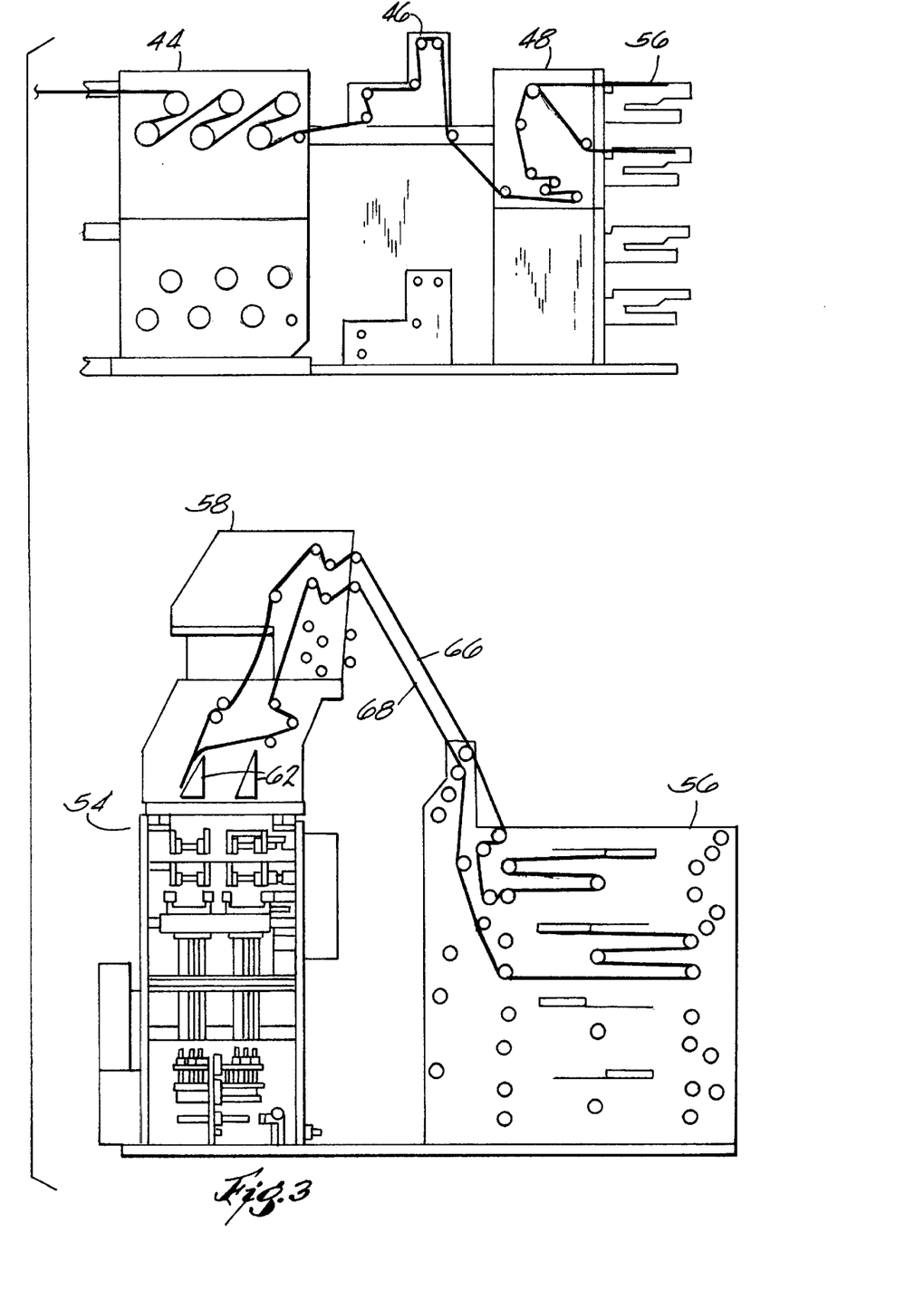
FIG. 3 illustrates the lead-in section of a folder on the screen of the touch screen system.

The virtual ribbons are then fed to a virtual folder 54, which includes a lead-in section 56, a draw section 58, and two former boards 62. In the illustration of the system as shown on the touch screen as shown in FIG. 2, the virtual folder is shown below the remainder of the press line. The image of the press line on the touch screen is changeable to allow an operator to zoom in on certain areas of the press line in order to obtain an expanded view so as to allow the operator to more easily pull the virtual web (or virtual ribbons) through the tight spots on the press line. For example, FIG. 3 illustrates an expanded view of the right end of the press line shown in FIG. 2. A side view of the lead-in section 56 of the folder is shown on the top line, with a front view shown in FIG. 3.

The actual folder may be, for example, a double former pinless folder, and operates to align one or more ribbons (generally one on top of the other) and fold them longitudinally. The folder also includes two cutting units each of which is operable to cut one or more folded ribbons in a direction transverse to the direction of web movement to produce a plurality of signatures. A cutoff control system operates to control the longitudinal position of an image on the ribbons with respect to the cutting unit such that the ribbons are cut at the appropriate time in order to separate the repeating images on the web. The folder also includes a fan delivery unit including a diverter section which is operable to load the signatures onto one or more conveyor lines.

FIGS. 4–7 illustrate various ways to web-up the folder. Each figure shows four ribbons coming in to the lead-in section 56 and being directed to the draw section 58 and then to one of the former boards 62. The lead-in section includes four compensators, 1C, 2C, 3C, and 4C; four angle bars 1A, 2A, 3A, and 4A; and a plurality of rollers 60.

Figure 4:
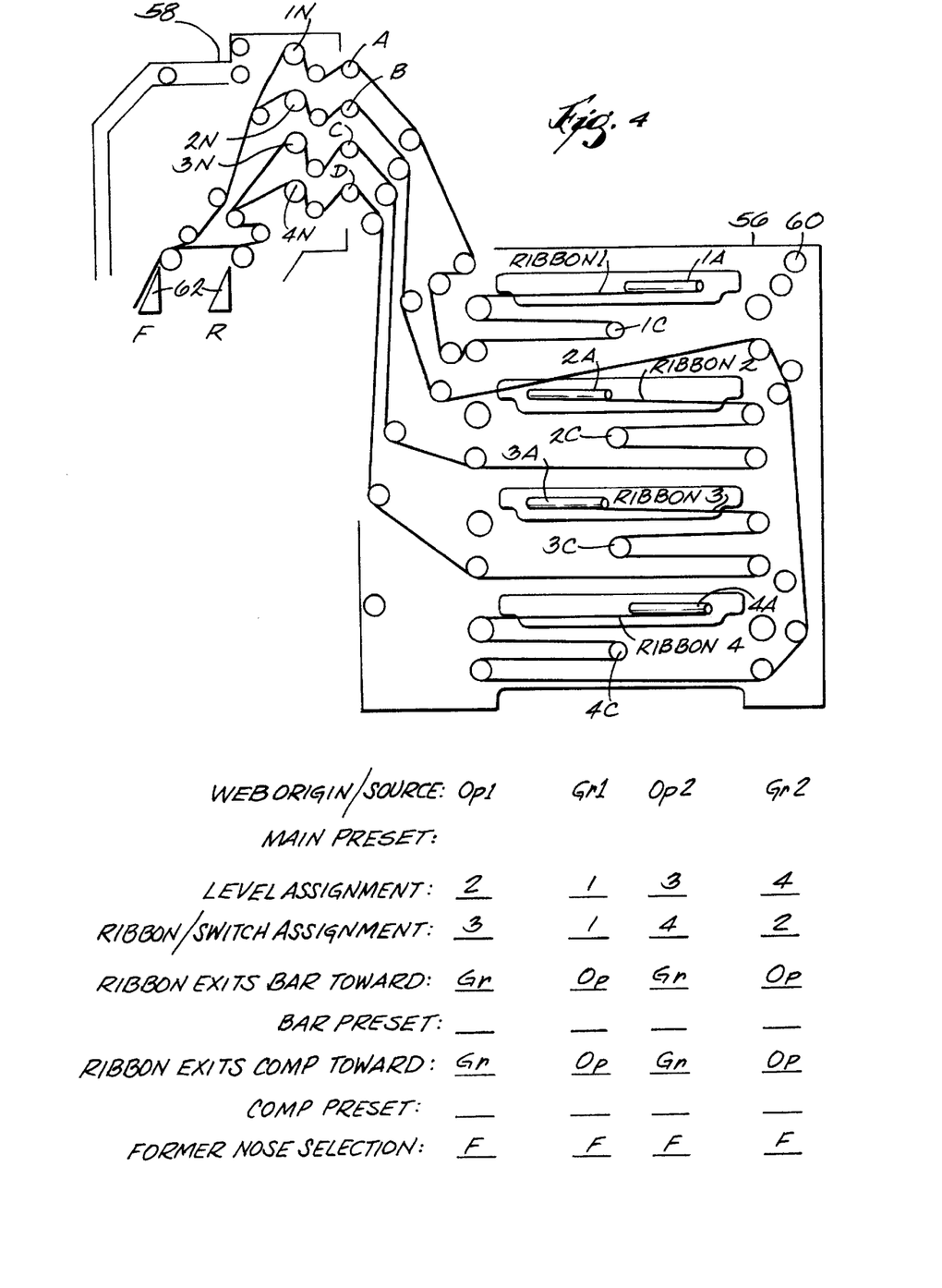
FIGS. 4–7 illustrate various web-up configurations for the lead-in section of a folder.

The angle bars can be initially turned to the left or to the right. For example, FIG. 4 illustrates angle bars 1A and 4A turned to the right and angle bars 2A and 3A turned to the left. The compensators can be initially webbed up from the left or from the right. For example, FIG. 4 illustrates compensators 1C and 4C webbed up from the left and compensators 2C and 3C webbed up from the right.

Figure 6:
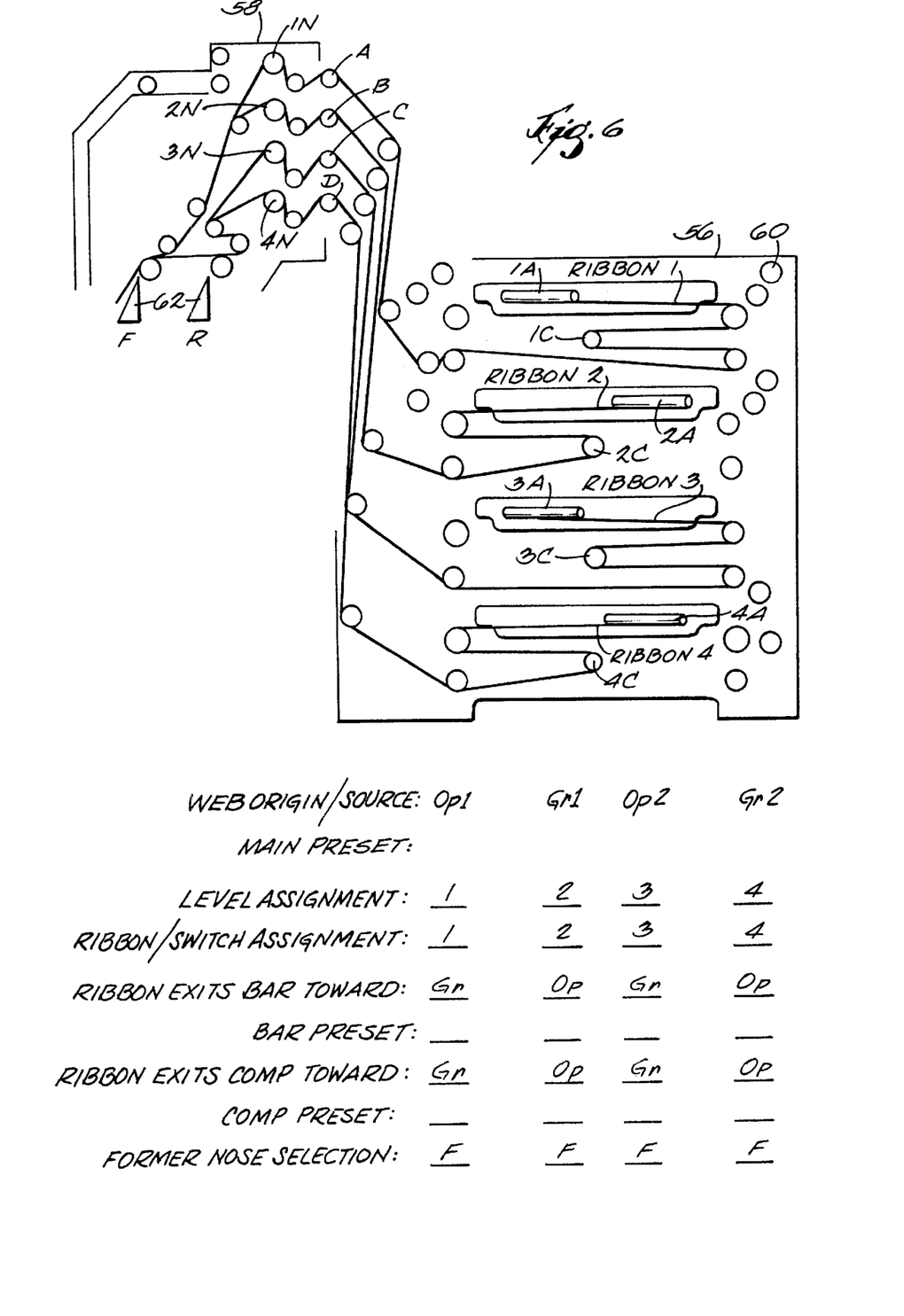
Figure 7:
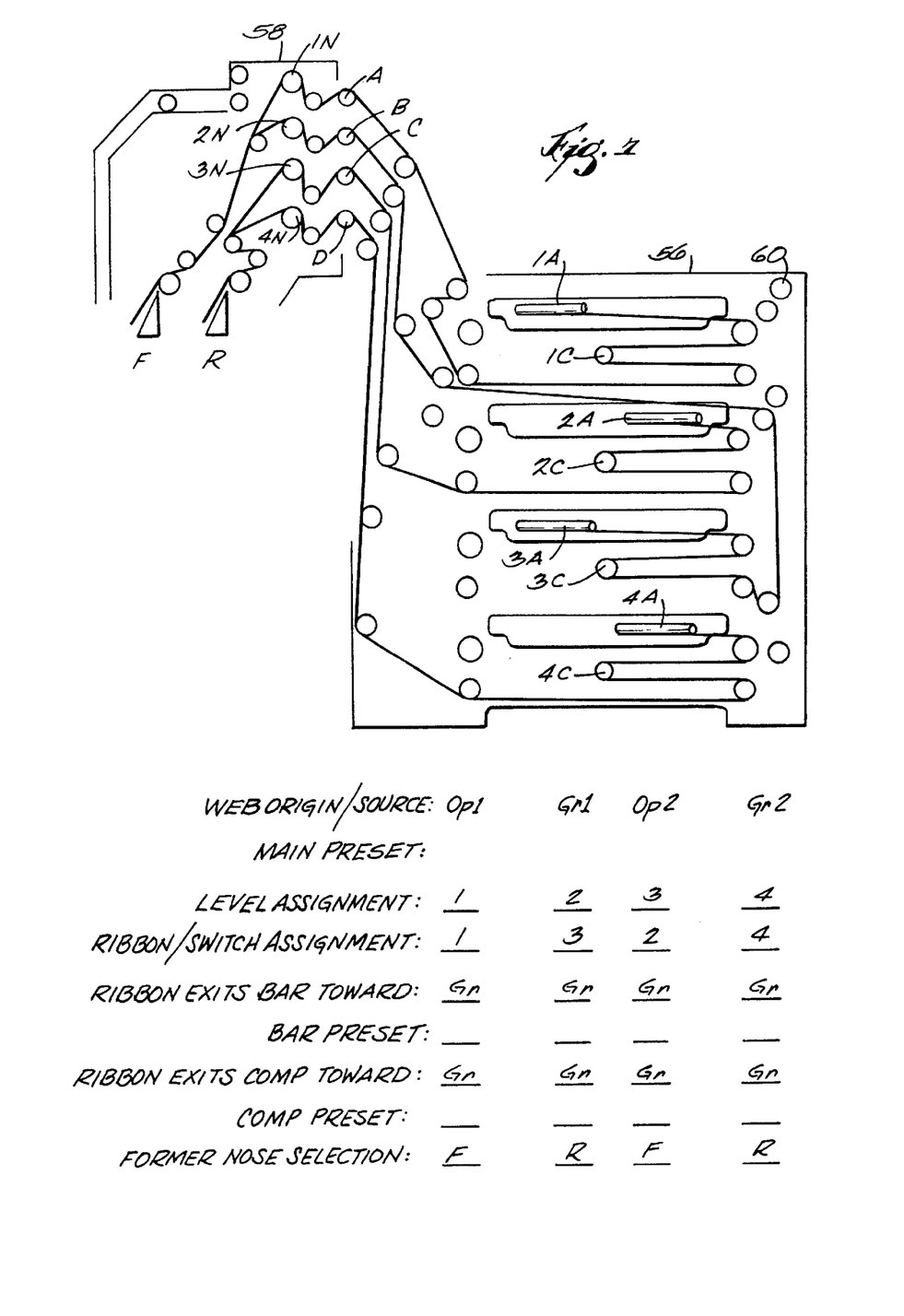

The draw section of the folder includes rollers 1N–4N and rollers A–D. The manner in which the ribbons exit the lead-in section to be fed to the draw section of the folder is variable. In particular, FIGS. 4, 6, and 7 illustrate a web-up configuration wherein the top most ribbon in the lead-in section (ribbon 1) is fed to roller A and roller 1N in the draw section of the folder and is thus the top most ribbon in the draw section. Additionally, in FIG. 4, ribbon 2 is fed to roller C and roller 3N. Ribbon 3 is fed to roller D and roller 4N. Ribbon 4 is fed to roller B and roller 2N.

Figure 5:
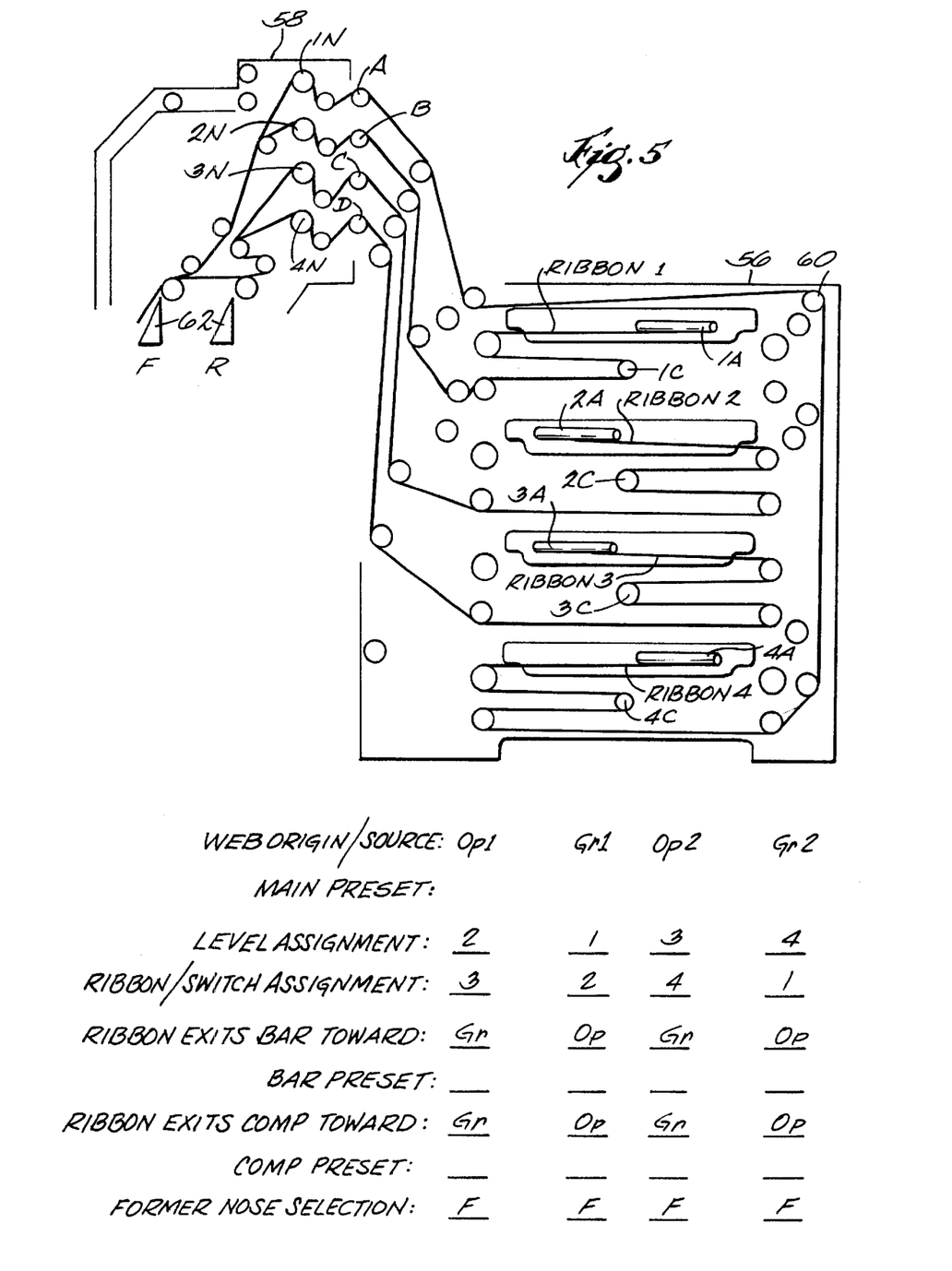

FIG. 5, however, illustrates ribbon 1 fed to roller B of the folder and roller 2N. Ribbon 2 is fed to roller C and roller 3N. Ribbon 3 is fed to roller D and roller 4N. Ribbon 4 is fed to roller A and roller 1N.

The four different web-up configurations that are shown in FIGS. 4–7 illustrate that the ordering of the ribbons in the lead-in section may change as the ribbons are fed to the draw section of the folder. The way that the ribbons are interleaved (i.e., fed from the lead-in section to the draw section) depends on how the pages of the signature to be produced are arranged on the printing cylinder.

Figure 8:
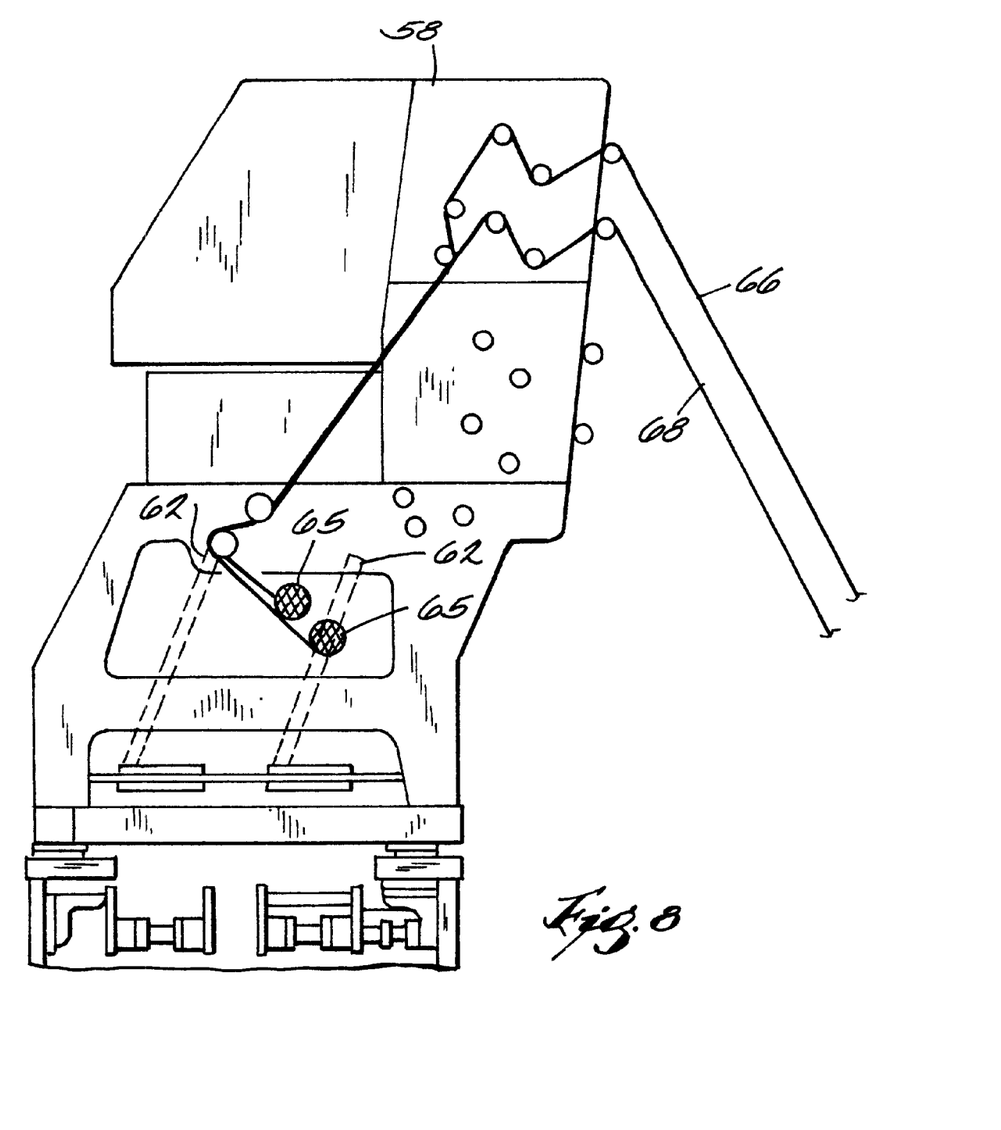
FIG. 8 displays finger drag points used in the process of "dragging" the virtual web through the press. The finger drag points represent the locations of the operator's fingers on the touch screen. By moving one's finger through the press, the virtual web is dragged through the press and a web-up configuration is specified.

In operation, the touch screen is capable of accepting input from a human operator who uses a finger to pull a virtual web or virtual ribbons 66, 68 through the image of the press line on the screen. This is schematically shown in FIG.

8. The finger drag points 65 represent the locations of the operator's finger on the touch screen. In this manner, the operator inputs a particular web-up configuration for a given press run to the touch screen system.

The computer is programmed to calculate various web distances between points on the press line based on the web-up configuration entered, i.e., based on how the web is drawn through-all the rollers, printing units and web processing stations of the given press line. These distances are communicated to the product tracking PLC. The touch screen system also communicates the specific product tracking devices which are being used in the specific web-up configuration entered to the product tracking PLC.

The computer is also programmed to perform a mapping of the control switches of the folder based upon the web-up configuration entered on the touch screen. The folder includes control switches which control the movement of an associated ribbon at the draw section of the folder. The touch screen system provides the control switches with appropriate mapping information based on the particular web-up configuration entered such that the control switches are correctly associated with the corresponding angle bars or compensators in the lead-in section in order to directly control the movement of the ribbons at the draw section regardless of the way the web is webbed up through the lead-in section. In other words, a given control switch always moves the same ribbon in the draw section, but is associated with different angle bars and compensators depending on the web-up configuration.

In particular, the angle bars and compensators in the lead-in section are moved by motors which are controlled by the control switches. Thus, the control switches are mapped to be associated with the correct angle bars and compensators such that using a control switch moves a ribbon's associated angle bar or compensator appropriately. For example, the control switch used to control the lateral position of the lower most ribbon coming in to rollers D and 4N of the draw section in FIG. 4 must be mapped to control the movement of angle bar 3A. Similarly, the control switch used to control the longitudinal position of that lower most ribbon must be mapped to control the movement of compensator 3C.

The control switches are mapped according to the web-up configuration entered in order to make it easier for an operator to use the switches without having to know the particular web-up configuration in the lead-in section. Thus, it is not necessary for the operator to know whether the angle bar associated with a particular ribbon is initially turned to the gear side or the operator side of the press. Similarly, it is not necessary for the operator to know whether the compensator is webbed up from the left or from the right. Thus, based on the web-up configuration entered, the touch screen system will provide information to the control switches so that moving the control switch in one direction will provide consistent results. For example, moving the control switch associated with lateral movement of the lower most ribbon at the draw section of the folder in a certain way will produce the same movement of that ribbon regardless of whether the angle bar 3A is initially turned to the left as shown in FIG. 4, or turned to the right. Similarly, moving the control switch associated with longitudinal movement of the lower most ribbon in the draw section of the folder in a certain way will produce the same movement of that ribbon regardless of whether ribbon 3 at the lead-in section is webbed through the compensator from the left or from the right. As a further example, a single control switch will control the lateral movement of the top ribbon in the draw section of the folder regardless of how the ribbon is webbed through the lead-in section. For a web-up configuration as shown in FIG. 4, that same control switch will control the movement of angle bar 1A. For a web-up configuration as shown in FIG. 5, that same control switch will control the movement of angle bar 4A. Using the control switch associated with lateral movement of the top ribbon will move the top ribbon the same way regardless of whether the ribbon's associated angle bar is initially turned to the gear side or to the operator side.

What is claimed is:

1. A method for providing web length information associated with a particular web-up configuration of a press line to a product tracking system, the method comprising the steps of:
   simulating a selected web-up configuration on a visual display device;
   calculating web length information based on the simulated web-up configuration; and
   communicating the web length information to the product tracking system.

2. The method of claim 1 wherein the step of simulating a selected web-up configuration includes pulling a virtual web through a selected path on a drawing of a press line.

3. The method of claim 2 wherein the visual display device is a touch screen.

4. The method of claim 3 further including the steps of determining the product tracking devices associated with the selected web-up configuration and communicating the associated product tracking devices to the product tracking system.

5. The method of claim 1 wherein the step of calculating web length information is performed by a computer.

6. A method for simulating a selected one of a plurality of web-up configurations for a press line to provide web length information associated with the selected web-up configuration to a product tracking system, the method comprising the steps of:
   providing a drawing of a press line on a touch screen;
   pulling a virtual web through the drawing to illustrate a selected web-up configuration;
   calculating web length information based on the selected web-up configuration; and
   communicating the web length information to the product tracking system.

7. The method of claim 6 further including the steps of determining the product tracking devices associated with the selected web-up configuration and communicating the associated product tracking devices to the product tracking system.

8. The method of claim 7 wherein the step of calculating web length information is performed by a computer.

9. A method for mapping a plurality of control switches to corresponding web control devices in the lead-in section of a folder, wherein each switch is permanently associated with one of a plurality of ribbons in the draw section of the folder, the method comprising the steps of:
   simulating a web-up configuration of the plurality of ribbons through the lead-in section and draw section of the folder on a touch screen; and
   determining which web control device is associated with each control switch based on the simulated web-up configuration.

10. The method of claim 9 wherein the web control devices include angle bars.

11. The method of claim 9 wherein the web control devices include compensators.

12. The method of claim 9 wherein the web-up configuration is simulated by pulling a virtual web through a selected path on a drawing of a press line on the touch screen.

13. The method of claim 12 wherein the web control devices include angle bars.

14. The method of claim 12 wherein the web control devices include compensators.

15. A method for simulating a selected one of a plurality of web-up configurations for at least a portion of a press line, the method comprising:

providing a drawing of at least a portion of a press line on a touch screen;

moving a virtual web through the drawing to illustrate a selected web-up configuration; and calculating web length information based on the selected web-up configuration.

16. A method for determining web length information associated with a particular web-up configuration of a press line, the method comprising:

simulating a selected web-up configuration on a visual display device; and calculating web length information based on the simulated web-up configuration.

17. The method of claim 16 and further includes the act of communicating the web length information to a product tracking system.

18. The method of claim 16 wherein the act of simulating a selected web-up configuration includes pulling a virtual web through a selected path on a drawing of a press line.

19. The method of claim 16 wherein the visual display device is a touch screen.

20. The method of claim 17 and further including the acts of determining the product tracking devices associated with the selected web-up configuration and communicating the associated product tracking devices to the product tracking system.

* * * * *